US010819887B2

(12) United States Patent
Huang et al.

(10) Patent No.: US 10,819,887 B2
(45) Date of Patent: Oct. 27, 2020

(54) SHELTER MODULE

(71) Applicant: GETAC TECHNOLOGY CORPORATION, Hsinchu County (TW)

(72) Inventors: Tzu-Chiu Huang, Taipei (TW); Juei-Chi Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 262 days.

(21) Appl. No.: 16/031,146

(22) Filed: Jul. 10, 2018

(65) Prior Publication Data
US 2019/0246014 A1 Aug. 8, 2019

(30) Foreign Application Priority Data
Feb. 7, 2018 (TW) .............................. 107104224 A

(51) Int. Cl.
H05K 1/14 (2006.01)
H04N 5/225 (2006.01)
G06F 1/16 (2006.01)
E05D 15/06 (2006.01)

(52) U.S. Cl.
CPC ....... *H04N 5/2252* (2013.01); *E05D 15/0621* (2013.01); *G06F 1/1686* (2013.01); *E05Y 2900/606* (2013.01)

(58) Field of Classification Search
USPC ......................................... 361/737, 728, 756
See application file for complete search history.

(56) References Cited

U.S. PATENT DOCUMENTS

| | | | |
|---|---|---|---|
| 7,307,846 B2 * | 12/2007 | Du ........................ | G06F 1/1616 361/727 |
| 10,481,633 B1 * | 11/2019 | Kinoshita ............ | H04N 5/2254 |
| 2004/0001321 A1 * | 1/2004 | Lin ......................... | G06F 1/181 361/727 |
| 2012/0056520 A1 * | 3/2012 | Liu ........................ | G06F 1/181 312/312 |
| 2014/0065860 A1 * | 3/2014 | Wang ................... | H01R 13/447 439/136 |

* cited by examiner

Primary Examiner — Hung S. Bui

(57) ABSTRACT

A shelter module includes a casing and a sliding door. The casing has an outer surface and a limiting slot. The limiting slot sinks inward from the outer surface. The limiting slot has a bottom side, a through hole and a first tactile bump. The through hole is disposed on the bottom side. The first tactile bump protrudes from the bottom side. The sliding door slides between an open position and a closed position in the limiting slot to expose or hide the through hole. The sliding door has a hiding side facing the bottom side. The sliding door has its thickness reduced from the hiding side to form a relief recess and an interfering portion adjacent to the relief recess. As soon as the sliding door slides from the open position to the closed position, the interfering portion slides past the first tactile bump to generate a tactile feedback.

9 Claims, 9 Drawing Sheets

SHELTER MODULE

CROSS-REFERENCE TO RELATED APPLICATIONS

This application claims priority from Taiwan Patent Application No. 107104224, filed on Feb. 7, 2018, the entire disclosure of which is hereby incorporated by reference.

BACKGROUND OF THE INVENTION

Field of the Invention

The present invention relates to shelter modules and more particularly to an active shelter module.

Description of the Prior Art

Due to technological advancement, computers are becoming more versatile, performing tasks such as word processing, Web browsing, video streaming, video games and the like. Take video streaming as an example, a computer capable of video streaming comes with a webcam. The webcam captures images from a user's end and, in real time, sends the images to another user's computer through a computer network so that the other user can watch the images.

However, rapid development of the Internet is accompanied by the rampant hacking of personal computers. For instance, hackers spread malware, such as Trojans, on the Internet to infect computers so that the hackers can remotely control the computers with a view to committing crimes. As a result, it is possible that webcams installed on computers are remotely controlled by the hackers and thereby turned on by the hackers in the computer users' ignorance. Therefore, the computer users are likely to have their privacy exposed in cyberspace but are unaware of the exposure.

In view of this, a sliding cover is disposed in front of a conventional webcam to shelter a lens thereof. The user may hide the lens with the sliding cover whenever the webcam is idle. Hence, even if the webcam is turned on by a hacker in the webcam user's ignorance, the lens of the webcam will be hidden by the sliding cover, and thus the hacker will fail to infringe on the user's privacy. However, electronic products nowadays have a trend toward being thin such that, given limited space, provision of a tactile sense of snap-engagement between ON state and OFF state precludes reduction of the thickness of the sliding cover. Furthermore, considerations must be given to durability of snap-engagement structures of thin electronic products.

SUMMARY OF THE INVENTION

The present invention provides a shelter module which overcomes drawbacks of the prior art by meeting both the need for a tactile sense of snap-engagement of a sliding cover and the need for a thin sliding cover, as well as meeting both the need for positioning of the sliding cover and a groove configured to dispose the sliding cover, and the need to ensure high durability of a snap-engagement structure therebetween, thereby allowing the shelter module to provide a tactile sense of snap-engagement repeatedly.

The shelter module disclosed in an embodiment of the present invention comprises a casing and a sliding door. The casing has an outer surface and a limiting slot. The limiting slot sinks inward from the outer surface. The limiting slot has a bottom side, a through hole and a first tactile bump. The through hole is disposed on the bottom side. The first tactile bump protrudes from the bottom side. The sliding door slides between an open position and a closed position in the limiting slot to expose or hide the through hole. The sliding door has a hiding side. The hiding side faces the bottom side. The sliding door has its thickness reduced from the hiding side to form a relief recess and an interfering portion adjacent to the relief recess. The interfering portion is flush with the hiding side. As soon as the sliding door slides from the open position to the closed position, the interfering portion slides past the first tactile bump to generate a tactile feedback.

Regarding a shelter module of the embodiment mentioned above, an interfering portion and tactile bumps are disposed on a hiding side of a sliding door and a bottom side of a limiting slot, respectively, rather than on the lateral side of the sliding door and the groove-ward side of the limiting slot, respectively; hence, the length of the interfering portion and the tactile bumps can be increased without increasing the thickness of the shelter module, further enhancing abrasion tolerance between the interfering portion and the tactile bumps. Hence, the shelter module meets both the need to render the sliding door thin and the need for high durability between the interfering portion of the sliding door and the tactile bumps of the limiting slot.

Moreover, a sense of vibration, generated as a result of interference between the interfering portion and the tactile bumps while the sliding door is sliding, serves to notify the user that the sliding door has reached the open position or the closed position.

The above summary of the present invention and the detailed description of the embodiments of the present invention below are intended to demonstrate and explain the principles of the present invention and provide further interpretation of the claims of the present invention.

DETAILED DESCRIPTION OF THE EMBODIMENTS

Figure 1:
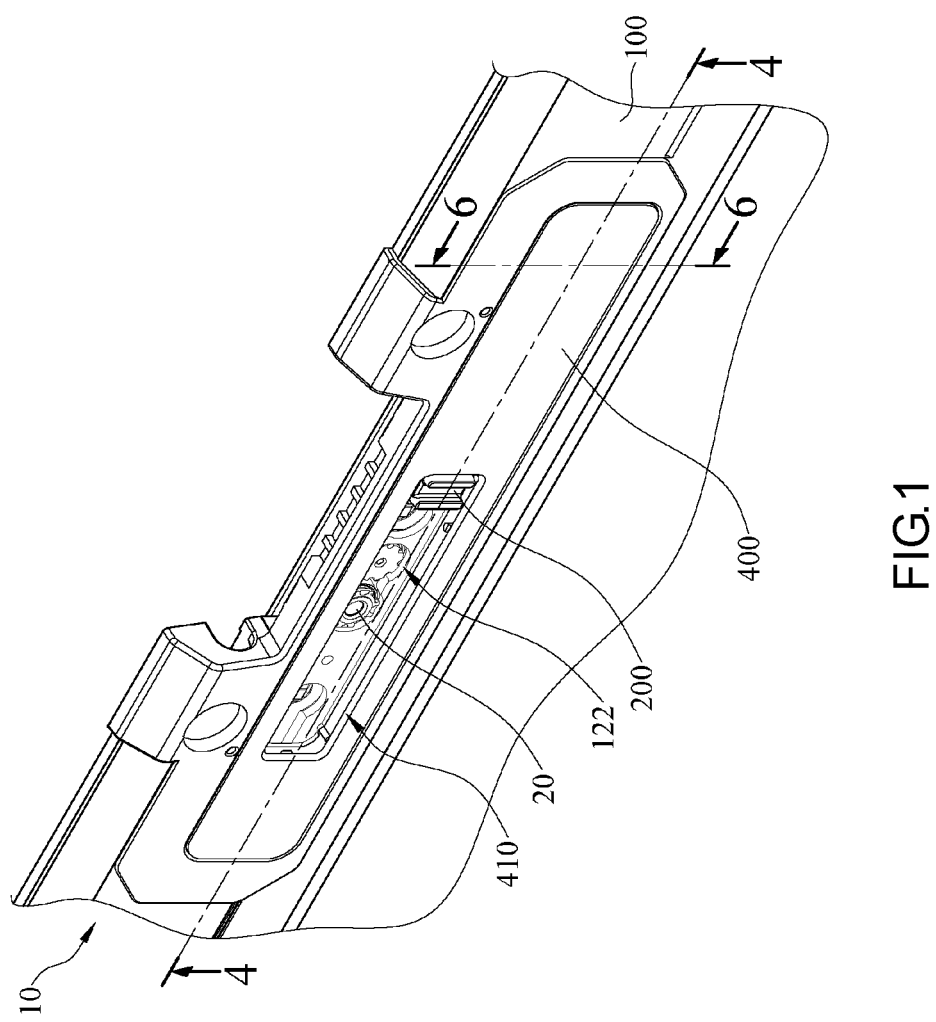
FIG. 1 is a perspective view of a shelter module operating in conjunction with a picture-taking module according to the first embodiment of the present invention.
Figure 2:
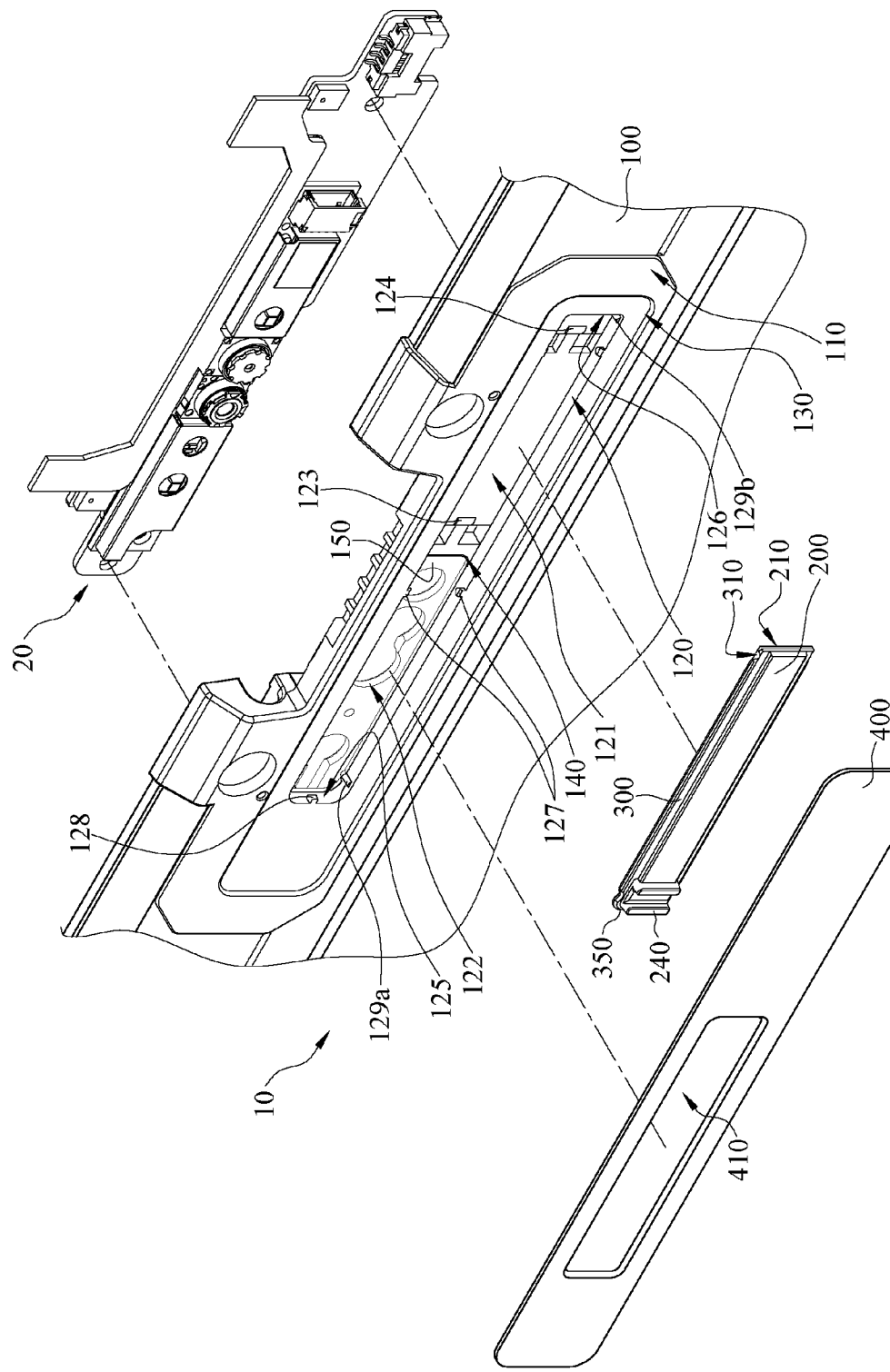
FIG. 2 is an exploded view of FIG. 1.
Figure 3:
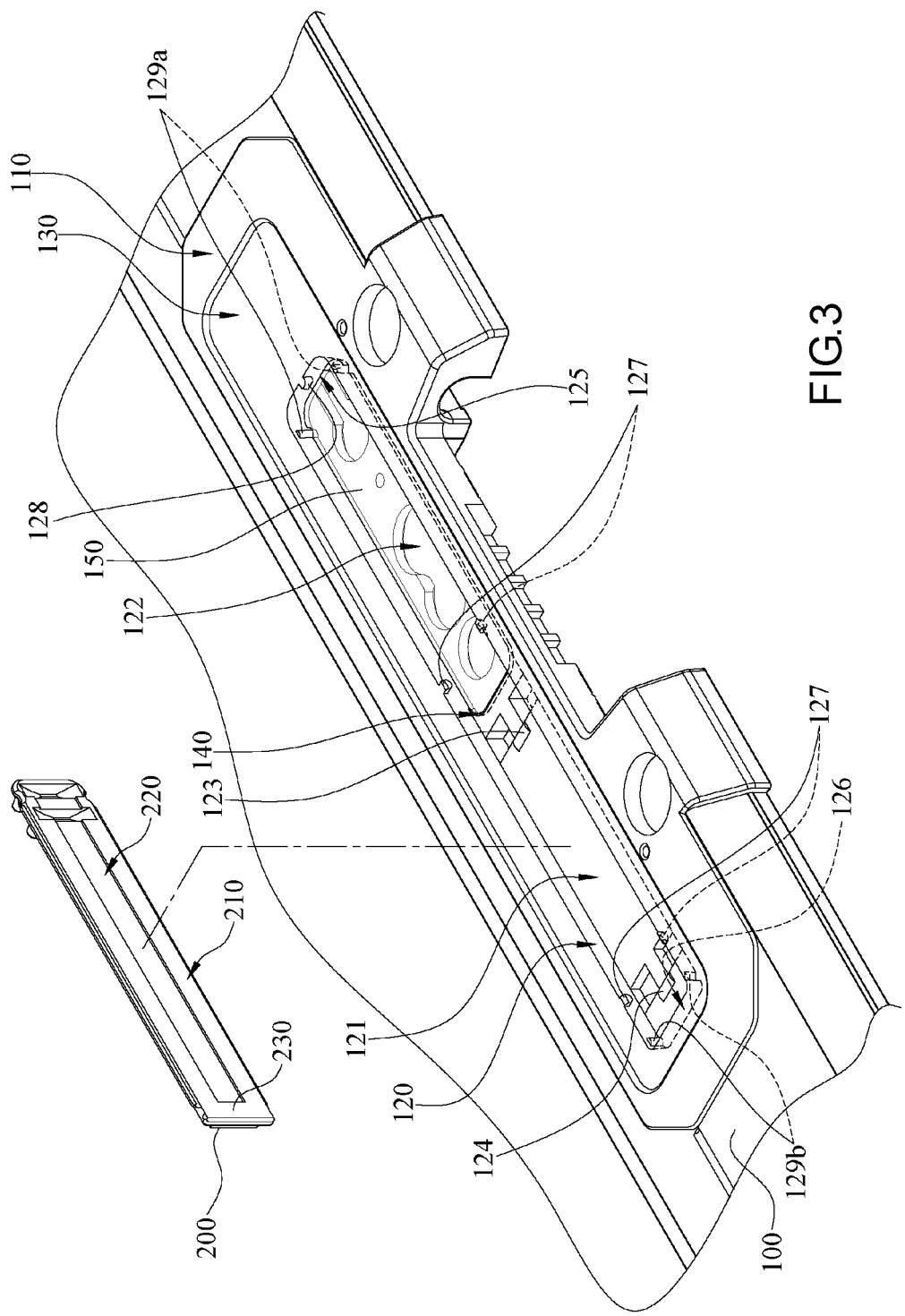
FIG. 3 is an exploded view of a casing and a sliding door of FIG. 2 from another angle.

Referring to FIG. 1 through FIG. 3, there are shown a perspective view of a shelter module operating in conjunction with a picture-taking module according to the first embodiment of the present invention, an exploded view of FIG. 1, and an exploded view of a casing and a sliding door of FIG. 2 from another angle, respectively.

In this embodiment, a shelter module 10 shelters or exposes a picture-taking module 20. The picture-taking module 20 includes, for example, two camera lenses and light sources for augmenting picture-taking brightness. The shelter module 10 comprises a casing 100, a sliding door 200, two rails 300 and a limiting patch 400. The casing 100 is, for example, a case for a display panel mounted in a notebook computer. The casing 100 has an outer surface 110, a limiting slot 120, an outer receiving slot 130, an inner receiving slot 140 and a filter 150. The limiting slot 120 sinks inward from the outer surface 110. The limiting slot 120 has a bottom side 121, through holes 122, a first tactile bump 123 and a second tactile bump 124. The bottom side 121 and the outer surface 110 face the same direction. The through holes 122 are disposed on the bottom side 121. The through holes 122 each penetrate the casing 100 and expose the two camera lenses and the light sources of the picture-taking module 20. The first tactile bump 123 and the second tactile bump 124 protrude from the bottom side 121. The first tactile bump 123 is closer to the through holes 122 than the second tactile bump 124. The surface of the first tactile bump 123 and the surface of the second tactile bump 124 are, for example, curved surfaces.

The limiting slot 120 further has a first stop side 125, a second stop side 126, first limiting bumps 127 and second limiting bumps 128. Both the first stop side 125 and the second stop side 126 connect with the bottom side 121. The first stop side 125 and the second stop side 126 are opposing sides of the limiting slot 120. The first stop side 125 is closer to the through holes 122 than the second stop side 126. The first limiting bumps 127 protrude inward from the edge of the limiting slot 120. The first limiting bumps 127 are paired in twosomes. Two paired first limiting bumps 127 are disposed between the first stop side 125 and the second stop side 126. The two paired first limiting bumps 127 are arranged in a direction from the first stop side 125 to the second stop side 126. The second limiting bumps 128 protrude from the first stop side 125.

In this embodiment, the limiting slot 120 further has positioning bumps 129a, 129b. The positioning bumps 129a, 129b protrude inward from the edge of the limiting slot 120. The two positioning bumps 129a are closer to the first stop side 125 than the two positioning bumps 129b.

The outer receiving slot 130 and the inner receiving slot 140 are disposed outward and inward to the limiting slot 120, respectively, and are in communication with the limiting slot 120. Arranged in the inward direction away from the outer surface 110 are the outer receiving slot 130, limiting slot 120 and inner receiving slot 140. The through holes 122 are disposed on the bottom side of the inner receiving slot 140. The filter 150 is disposed at the inner receiving slot 140 and attached to the casing 100 such that the filter 150 covers the through holes 122. The filter 150 covers the through holes 122 to ward off dust or block light which might otherwise affect the picture-taking process performed by the picture-taking module 20, thereby enhancing the picture-taking quality of the picture-taking module 20.

Figure 4:
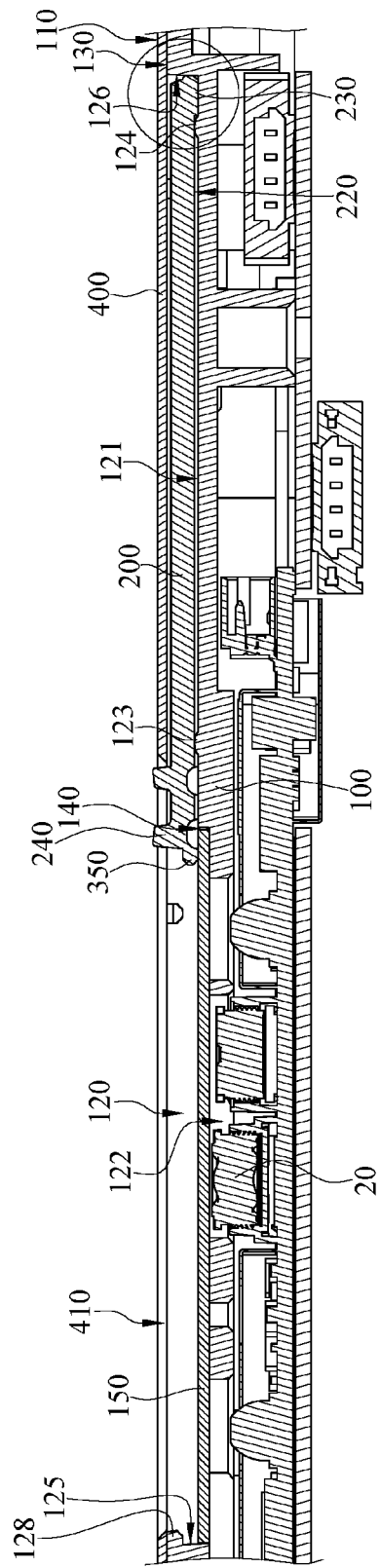
FIG. 4 is a cross-sectional view of FIG. 1.
Figure 5:
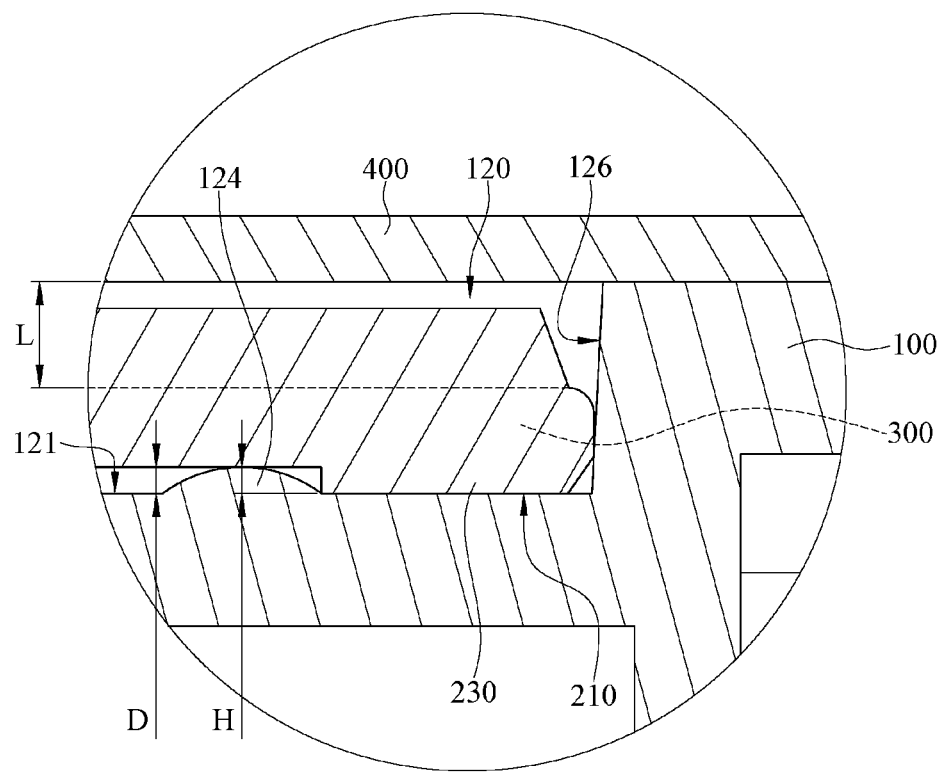
FIG. 5 is a partial enlarged view of FIG. 4.
Figure 6:
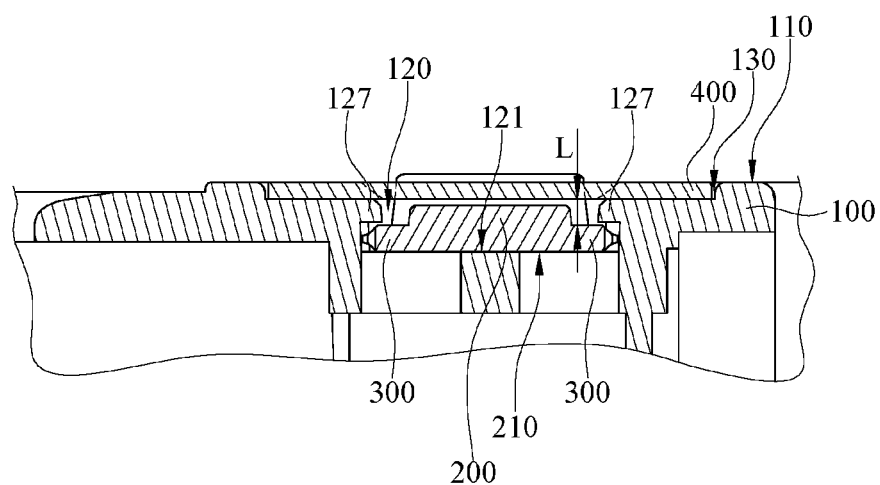
FIG. 6 is a cross-sectional view taken along line 6-6 of FIG. 1.

Referring to FIG. 4 through FIG. 6, there are shown a cross-sectional view of FIG. 1, a partial enlarged view of FIG. 4, and a cross-sectional view taken along line 6-6 of FIG. 1, respectively. The sliding door 200 slides between an open position (shown in FIG. 4) and a closed position (shown in FIG. 8) in the limiting slot 120 to expose or hide the through holes 122. The sliding door 200 has a hiding side 210. The hiding side 210 faces the bottom side 121. The sliding door 200 has its thickness reduced from the hiding side 210 to form a relief recess 220 and an interfering portion 230 adjacent to the relief recess 220. The depth D of the relief recess 220 is substantially equal to the height H by which the first tactile bump 123 and the second tactile bump 124 protrude from the bottom side 121. The interfering portion 230 is flush with the hiding side 210; hence, a surface attributed to the interfering portion 230 and positioned proximate to the bottom side 121 is coplanar with the hiding side 210.

An operating portion 240 is disposed on the other side of the sliding door 200 and thus faces away from the hiding side 210. A user pulls the operating portion 240 in order to cause the sliding door 200 to slide relative to the casing 100.

The two rails 300 connect with two opposing sides of the sliding door 200, respectively. The two rails 300 are separated from the sliding door 200 by a clearance. The two rails 300 are limited by the first limiting bumps 127 in part and thus slide below the first limiting bumps 127 in part, respectively, while the sliding door 200 is sliding within the limiting slot 120. The rails 300 sliding below the first limiting bumps 127 is confined to between the bottom side 121 and the first limiting bumps 127. The two opposing ends of the two rails 300 each have a notch 310. The notches 310 correspond in position to the first limiting bumps 127, respectively. The notches 310 allow the two rails 300 to evade interference from the first limiting bumps 127 and thus be mounted in the limiting slot 120. The notches 310 will be selectively limited by the positioning bumps 129a, 129b in part, respectively, and thus positioned at the open position or the closed position, provided that the two rails 300 are below the first limiting bumps 127.

In this embodiment, a flange 350 is disposed at the sliding door 200 and positioned proximate to the first stop side. The two rails 300 meet at the flange 350, as the two rails 300 connect with two opposing ends of the flange 350, respectively. The flange 350 corresponds in position to the second limiting bumps 128. The purposes of the flange 350 and the second limiting bumps 128 are described later.

The limiting patch 400 is disposed at the outer receiving slot 130 and attached to the casing 100. The limiting patch 400 has a window 410. The window 410 exposes the operating portion 240. The window 410 exposes the through holes 122 and the picture-taking module 20, when the sliding door 200 is located at the open position. The limiting patch 400 presses against one side attributed to the sliding door 200 and positioned distal to the bottom side 121 to prevent detachment of the sliding door 200 from the limiting slot 120, thereby enhancing the beauty of the shelter module 10.

The two rails 300 are spaced apart from the limiting patch 400 by a distance L conducive to reduction in resistance generated by the limiting patch 400 toward the sliding door 200 while the sliding door 200 is sliding relative to the casing 100, thereby enabling the sliding door 200 to slide smoothly.

Figure 7:
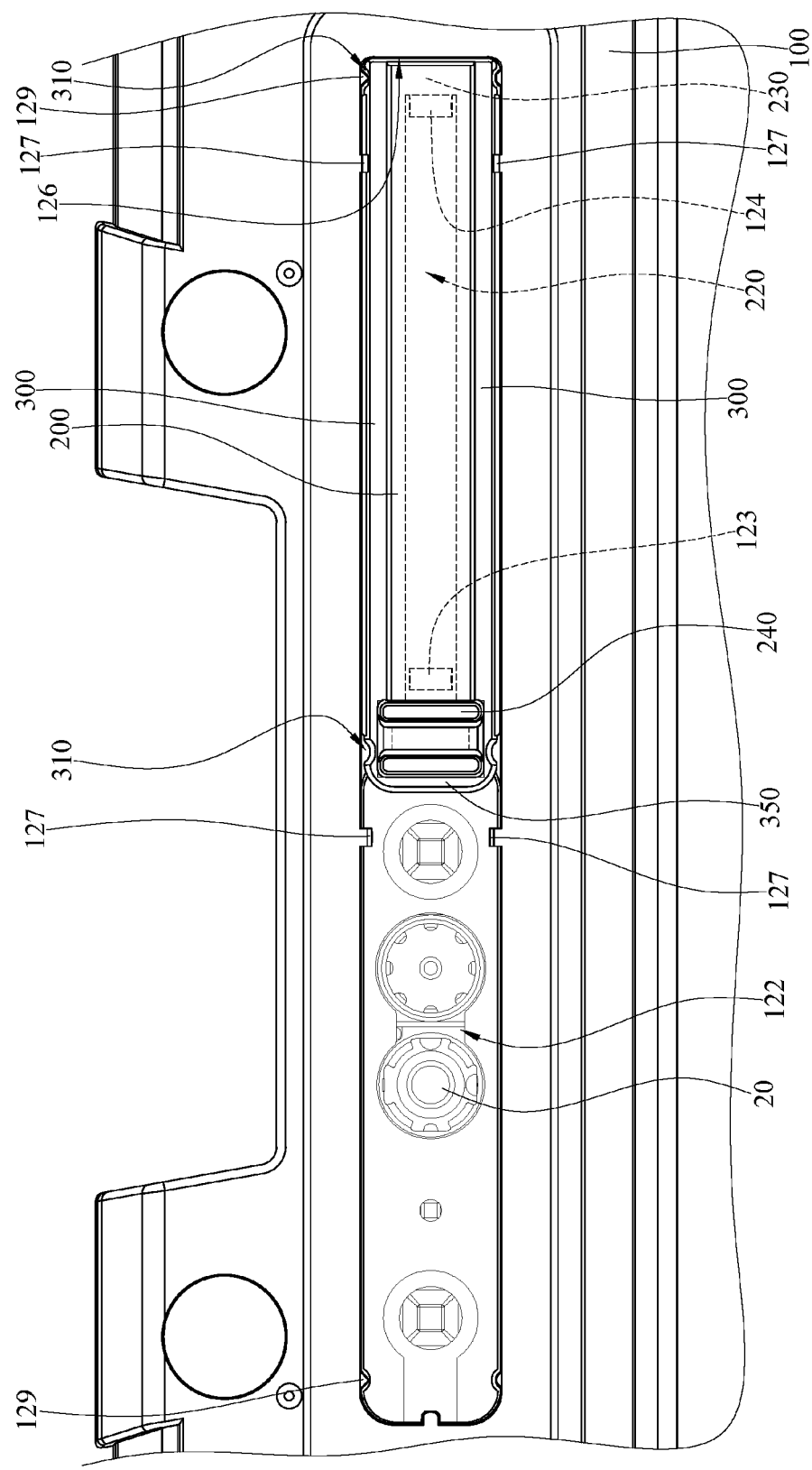
FIG. 7 through FIG. 9 are schematic views showing how to operate the shelter module.
Figure 8:
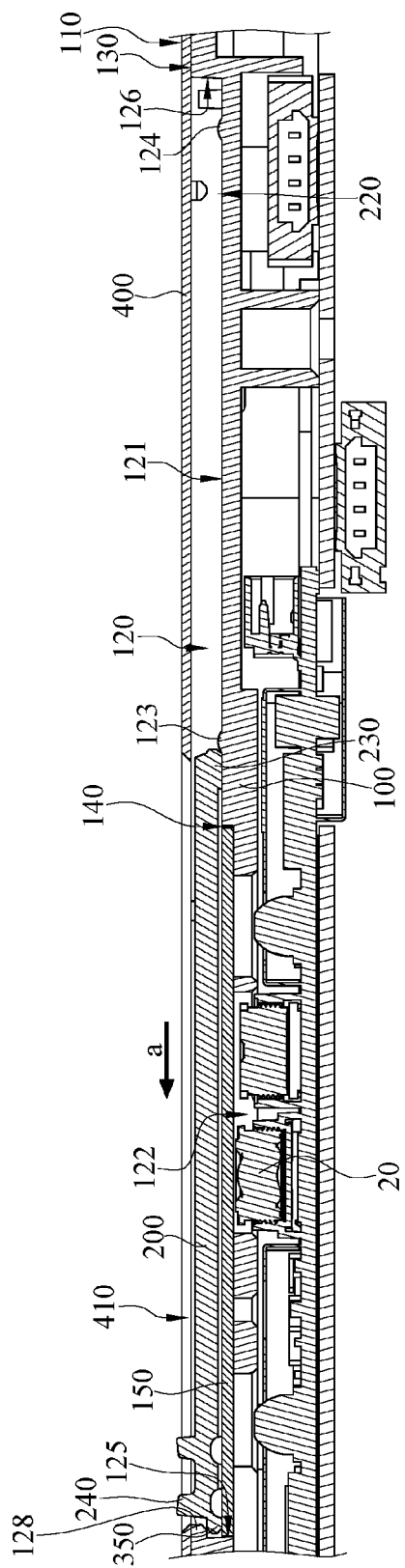
Figure 9:
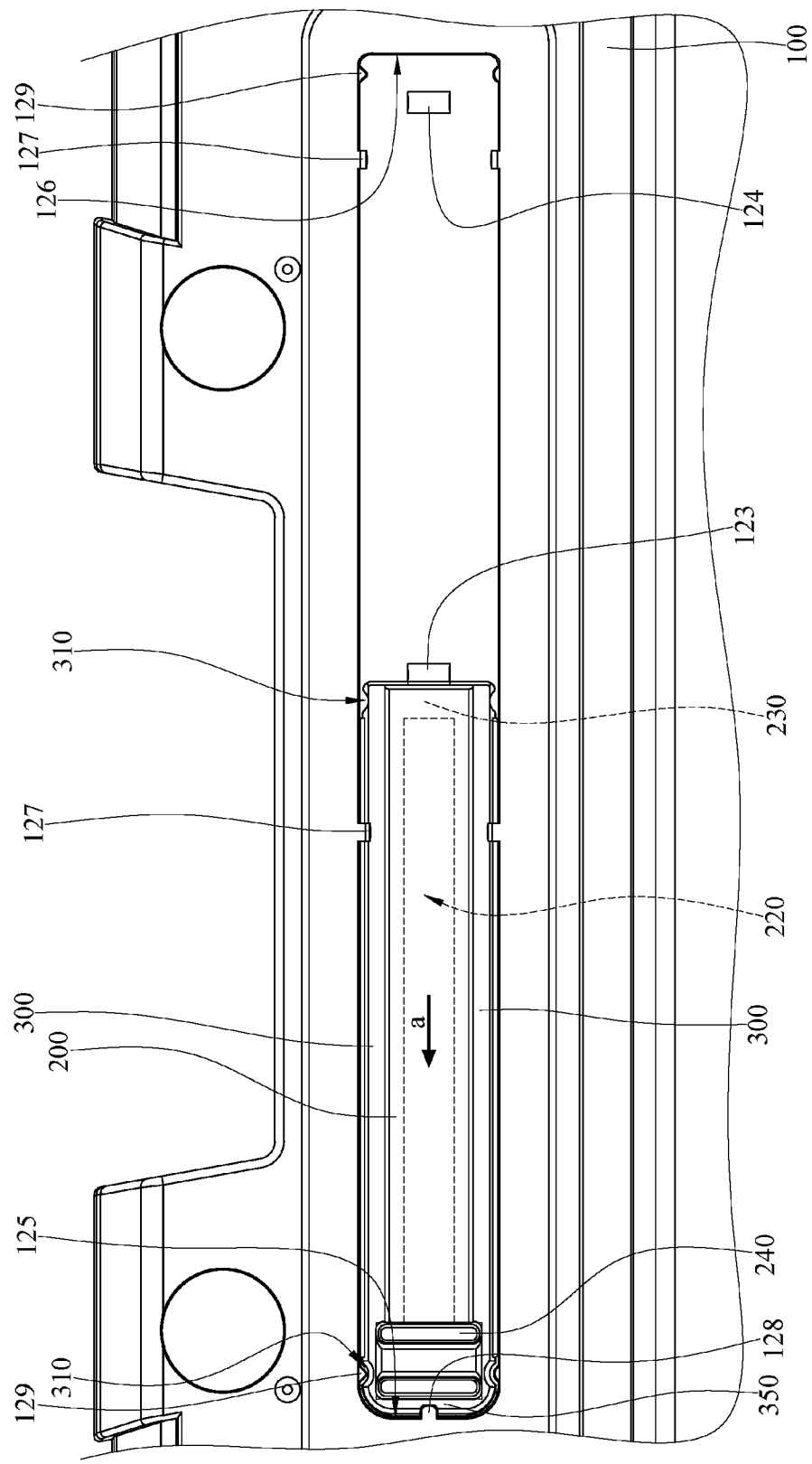

Refer to FIG. 4, FIG. 7 through FIG. 9 for further description of the present invention. FIG. 7 through FIG. 9 are schematic views showing how to operate the shelter module.

As shown in FIG. 4 and FIG. 7, to access the picture-taking module 20, the user leaves the sliding door 200 at the open position such that the picture-taking module 20 is exposed from the window 410 of the limiting patch 400. When the sliding door 200 is located at the open position, the interfering portion 230 of the sliding door 200 slides to a point between the second tactile bump 124 and the second stop side 126 and thus is limited by the second tactile bump 124 and the second stop side 126, thereby allowing the interfering portion 230 to be fixed to the open position.

Furthermore, the notches 310 of the rails 300 engage with the positioning bumps 129b to enhance the positioning of the sliding door 200.

As shown in FIG. 8 and FIG. 9, when the picture-taking module 20 is idle, a user pulls the operating portion 240 to cause the sliding door 200 to slide in direction a. As soon as the sliding door 200 slides in direction a, the interfering portion 230 of the sliding door 200 interferes with the second tactile bump 124 and slides past the second tactile bump 124 to generate a first tactile feedback. Then, the interfering portion 230 interferes with the first tactile bump 123 and slides past the first tactile bump 123 to generate a second tactile feedback, so as to notify the user that the sliding door 200 has arrived at the closed position. Once the sliding door 200 arrives at the closed position, the interfering portion 230 of the sliding door 200 will slide to a point between the first tactile bump 123 and the first stop side 125 such that the sliding door 200 will be limited by the first tactile bump 123 and the first stop side 125 and thus fixed to the closed position. The flange 350 disposed at the sliding door 200 is limited by the second limiting bumps 128 to further ensure that the sliding door 200 will not detach from the limiting slot 120. The notches 310 of the rails 300 engage with the positioning bumps 129a to enhance the positioning of the sliding door 200.

To access the picture-taking module 20, the user pulls the sliding door 200 reversely such that generation of the second tactile feedback indicates that the sliding door 200 has arrived at the open position.

As revealed by the aforesaid operation, interference of the interfering portion 230 and the tactile bumps enables the sliding door 200 to not only generate tactile feedbacks and thereby achieve a positioning prompt but also achieve the positioning of the sliding door 200 together with the stop sides. The interfering portion 230 and the tactile bumps are disposed on the hiding side 210 of the sliding door 200 and the bottom side 121 of the limiting slot 120, respectively, rather than on the lateral side of the sliding door 200 and the groove-ward side of the limiting slot 120, respectively; hence, the length of the interfering portion 230 and the tactile bumps can be increased without increasing the thickness of the shelter module 10, further enhancing abrasion tolerance between the interfering portion 230 and the tactile bumps.

The through holes 122 are provided in a plural number and correspond in quantity to the light sources and lenses of the picture-taking module 20, but the present invention is not limited thereto. If the picture-taking module 20 is a single lens which does not come with any external light source, the through holes 122 can be provided in the number of one. The tactile bumps are provided in the number of two, namely one for positioning the sliding door 200 at the open position, and the other for positioning the sliding door 200 at the closed position, but the present invention is not limited thereto. In a variant embodiment, the tactile bumps are adapted to position the sliding door 200 at the closed position only.

Figure 10:
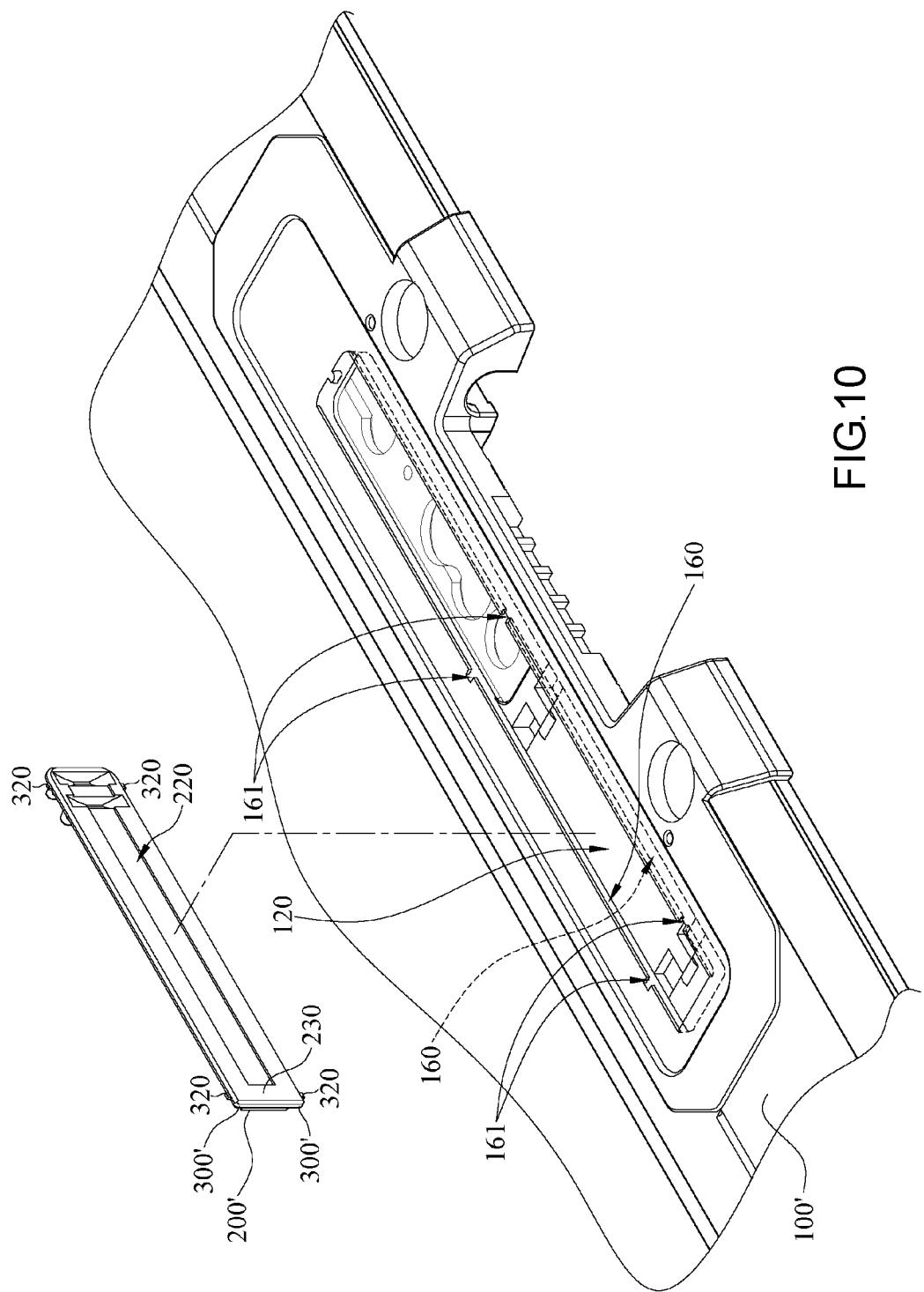
FIG. 10 is an exploded view of a casing and a sliding door according to the second embodiment of the present invention.

In the embodiment, the mounting and limiting of the sliding door 200 and the casing 100 is achieved by the notches 310 of the rails 300 and the first limiting bumps 127 of the limiting slot 120, but the present invention is not limited thereto. Refer to FIG. 10 for further description of the present invention. FIG. 10 is an exploded view of a casing and a sliding door according to the second embodiment of the present invention.

In this embodiment, a casing 100' has a limiting slot 120, two grooves 160 and mounting notches 161. The two grooves 160 are disposed at two opposing sides of the limiting slot 120, respectively. The mounting notches 161 are in communication with the two grooves 160, respectively. Similarly, a sliding door 200' has a relief recess 220 and the interfering portion 230 adjacent to the relief recess 220. Similarly, two rails 300' are connected to two opposing sides of the sliding door 200', respectively, but the two rails 300' each have two mounting bumps 320. The mounting bumps 320 penetrate the mounting notches 161, respectively, to allow the two rails 300' to be disposed at the two grooves 160, respectively. The mounting bumps 320 are limited by the grooves 160 while the sliding door 200' are sliding relative to the casing 100', thereby preventing detachment of the sliding door 200 from the limiting slot 120.

Regarding a shelter module of the embodiment, an interfering portion and tactile bumps are disposed on a hiding side of a sliding door and a bottom side of a limiting slot, respectively, rather than on the lateral side of the sliding door and the groove-ward side of the limiting slot, respectively; hence, the length of the interfering portion and the tactile bumps can be increased without increasing the thickness of the shelter module, further enhancing abrasion tolerance between the interfering portion and the tactile bumps. Hence, the shelter module meets both the need to render the sliding door thin and the need for high durability between the interfering portion of the sliding door and the tactile bumps of the limiting slot.

Moreover, a sense of vibration, generated as a result of interference between the interfering portion and the tactile bumps while the sliding door is sliding, serves to notify the user that the sliding door has reached the open position or the closed position.

In addition, the limiting slot has a stop side and tactile bumps so as to enable the positioning of the sliding door. Hence, the casing's positioning structure can be simplified, and thus just a single tactile bump is sufficient to position the sliding door in place.

Although the present invention is disclosed above by the aforesaid embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:
1. A shelter module, comprising:
 a casing having an outer surface and a limiting slot, the limiting slot sinking inward from the outer surface and having a bottom side, a through hole and a first tactile bump, the through hole being disposed on the bottom side, the first tactile bump protruding from the bottom side;
 a sliding door sliding between an open position and a closed position in the limiting slot to thereby expose or hide the through hole and having a hiding side, the hiding side facing the bottom side, wherein the sliding door has its thickness reduced from the hiding side to form a relief recess and an interfering portion adjacent to the relief recess, the interfering portion being flush with the hiding side and sliding past the first tactile bump to generate a tactile feedback as soon as the sliding door slides from the open position to the closed position; and
 a limiting patch attached to the casing and having a window which an operating portion of the sliding door is slidably disposed at.

2. The shelter module of claim 1, wherein a depth of the relief recess is substantially equally to a height of the first tactile bump.

3. The shelter module of claim 1, wherein the limiting slot further has a second tactile bump protruding from the bottom side, and the interfering portion slides past the second tactile bump to generate a tactile feedback as soon as the sliding door slides from the closed position to the open position.

4. The shelter module of claim 1, wherein the limiting slot has a first stop side connecting with the bottom side, and the sliding door stops at the first stop side after having slid to the closed position.

5. The shelter module of claim 4, wherein the limiting slot further has a second stop side opposing the first stop side and connecting with the bottom side, and the sliding door stops at the second stop side after having slid to the open position.

6. The shelter module of claim 1, further comprising at least a rail connected to the sliding door and spaced apart from the limiting patch.

7. The shelter module of claim 6, wherein the at least a rail has a notch snap-engaging with a positioning bump protruding inward from the limiting slot.

8. The shelter module of claim 6, wherein the limiting slot extends inward to form a limiting bump which the at least a rail slides below.

9. The shelter module of claim 8, wherein the at least a rail is in a number of two, with the two rails being connected to two opposing sides of the sliding door, respectively, and meeting at a flange limited by the limiting bump as soon as the sliding door is at the closed position.

* * * * *